United States Patent
Rivier et al.

(10) Patent No.: US 9,645,387 B2
(45) Date of Patent: May 9, 2017

(54) CUTOFF MECHANISM FOR AN OPTICAL MODULE AND AN OPTICAL MODULE COMPRISING SUCH A MECHANISM

(71) Applicant: AML Systems, Paris (FR)

(72) Inventors: Cyril Rivier, Courbevoie (FR); Hassan Koulouh, Le Pre Saint Gervais (FR); Claudio Chiatelli, Le Blanc Mesnil (FR)

(73) Assignee: AML Systems, Paris (FR)

( * ) Notice: Subject to any disclaimer, the term of this patent is extended or adjusted under 35 U.S.C. 154(b) by 420 days.

(21) Appl. No.: 13/852,105

(22) Filed: Mar. 28, 2013

(65) Prior Publication Data

US 2013/0258433 A1    Oct. 3, 2013

(30) Foreign Application Priority Data

Mar. 28, 2012   (FR) ..................... 12 52812

(51) Int. Cl.
*G02B 26/02*   (2006.01)
*F21S 8/10*    (2006.01)

(52) U.S. Cl.
CPC .......... *G02B 26/02* (2013.01); *F21S 48/1778* (2013.01)

(58) Field of Classification Search
CPC .. G02B 26/02; G02B 26/023; G02B 26/0841; G02B 5/005; G02B 26/04; G02B 21/06; G02B 26/0833; G02B 26/085; G02B 21/025; G02B 21/086; G02B 26/005; G02B 27/0018; G02B 6/353; G02B 1/105; G02B 1/116; G02B 21/00; G02B 21/0024; G09G 3/3433; G09G 2300/0426; G09G 3/346; G09G 2300/0456; G09G 2300/08; G09G 2310/0235; G09G 3/3466; G09G 2300/023; G09G 2300/0439; G09G 2300/0443; G09G 2300/0473; G09G 2300/0842; G09G 2300/0852; G09G 2310/0251; G03B 9/36; G03B 9/10; G03B 9/02; G03B 9/06; G03B 9/08; G03B 9/42; G03B 9/04; G03B 9/14; G03B 9/20; G03B 9/22; G03B 11/00; G03B 11/04; G03B 13/02; G03B 19/12; G03B 21/00; G03B 21/14; G03B 21/204; G03B 21/2066; B81B 2201/045;
(Continued)

(56) References Cited

U.S. PATENT DOCUMENTS

| 5,631,772 A * | 5/1997 | Mizukawa | G02B 23/18 359/399 |
| 2006/0060366 A1* | 3/2006 | Bodine | B25F 5/001 173/213 |

(Continued)

FOREIGN PATENT DOCUMENTS

| EP | 1 477 732 A1 | 11/2004 |
| FR | 2 868 507 A1 | 10/2005 |

(Continued)

OTHER PUBLICATIONS

JP2007236030A English machine translation.*
(Continued)

*Primary Examiner* — Scott J Sugarman
*Assistant Examiner* — Sharrief Broome
(74) *Attorney, Agent, or Firm* — Osha Liang LLP

(57) ABSTRACT

The invention relates to a cutoff mechanism (5) for an optical module comprising a housing (100) and a driving motor (30) provided with an armature resistance and being arranged to cause the movement of a light beam cutoff shield (10), said housing (100) being made of a plastic material, characterized in that said armature resistance is comprised between 25 and 120 Ohms.
The invention also relates to an optical module comprising such cutoff mechanism (5).

10 Claims, 3 Drawing Sheets

(58) Field of Classification Search
CPC .. B81B 2201/047; B81B 3/0021; B81B 1/00;
B81B 2203/0181; B81B 2203/0307;
B81B 2203/051; B81B 3/00; B81B
3/0035; B81B 3/0051; B81B 5/00; B81B
2201/0235; B81B 2203/0118; B81B
2203/0163; B81B 2203/0315
USPC ......... 359/227, 230, 233–236; 396/490–493,
396/510
See application file for complete search history.

(56) References Cited

U.S. PATENT DOCUMENTS

2009/0267439 A1* 10/2009 Okuno ................. H02K 53/00
310/156.38
2011/0147111 A1* 6/2011 Sun et al. ..................... 180/444

FOREIGN PATENT DOCUMENTS

| FR | 2868507 A1 | * | 10/2005 | ............... F21S 8/10 |
| GB | 2 379 101 A | | 2/2003 | |
| GB | 2379101 A | * | 2/2003 | ............... H02H 9/00 |
| JP | 2007236030 | * | 2/2006 | ............ H02K 23/26 |

OTHER PUBLICATIONS

French Search Report issued in French Application No. 1252812 dated Nov. 30, 2012 (2 pages).
Written Opinion issued in French Application No. 1252812 dated Mar. 28, 2012 (4 pages).

* cited by examiner

CUTOFF MECHANISM FOR AN OPTICAL MODULE AND AN OPTICAL MODULE COMPRISING SUCH A MECHANISM

The invention relates to a cutoff mechanism for an optical module and an optical module comprising such a cutoff mechanism. Said optical module is particularly intended for being inserted in an automobile projector, especially in an elliptical projector, being arranged in the front of the automobile vehicle.

Such optical modules possess a light source that projects light on a reflector. Light is then reflected on a lens so as to be reverted and returned back outside the vehicle under the form of a light beam. The optical modules also comprise a cutoff mechanism enabling to block out or not a part of the beam.

It is known to use cutoff mechanisms comprising a rotating cutoff shield being electrically operated to be moved, to order, from a first angular position, in which it blocks out a part of the light beam in order to limit the range of the projector to the low beam so as not to dazzle the other drivers circulating in the opposite direction, to a second angular position, in which it does not block out the light beam, the range of the projector then corresponding to the high beam.

There are also so-called multifunction projectors, in which the cutoff shield can assume more than two angular positions so as to block out selectively the light beam.

The shield is electrically operated by an actuator comprising an electric motor. The electric motor comprises a stator and a rotor provided with a set of coils, also called armature windings or armature. The armature presents a conductive wire being wound and thus a resistance, so-called armature resistance, corresponding to the resistance of the conductive wire.

The motor is mounted on a plastic housing of the cutoff mechanism. Due to the reduced space being available within the optical module to position the motor therein, it is known to use motors of small sizes having a reduced volume available for the coils and thus for the conductive wire. The conductive wire length is thus limited. Indeed, the motor torque being proportional to the section of the conductive wire, the section cannot be reduced beyond a threshold enabling the motor to present a sufficient torque to operate the cutoff shield. Now, the resistance of the conductive wire, i.e. the armature resistance being proportional to the length of the conductive wire, such "small" motor thus presents a weak armature resistance, i.e. lower than 25 Ohms.

Consequently, for a given voltage, the current intensity passing through the motor is significant and the latter is thus caused to dissipate much power, which leads to a significant motor self-heating. Such self-heating phenomenon is in particular defined by a so-called self-heating temperature.

Moreover, heat dissipated by the light source and the sun rays entering the optical module through the lens causes the internal environment of the optical module and thus of the motor to be heated. Such heating phenomenon is in particular defined by a so-called environment temperature.

The self-heating of the motor being significant, the temperature reached by the motor, i.e. the sum of the environment and self-heating temperatures, is also significant, which has some chance to damage the plastic housing, on which the motor is mounted.

To remedy such disadvantage, it is known to arrange an electronic board with the motor in the optical module. The electronic board reduces indeed the intensity of the current crossing the motor and thus the power the motor has to dissipate. However, such arrangement is expensive and cumbersome.

Another known solution consists in selecting the housing in metal, in virtue of its resistance to high temperatures, but such material has the disadvantage to be heavy and expensive.

The invention thus aims at improving the situation.

Indeed, it proposes a cutoff mechanism for an optical module comprising a housing and a driving motor provided with an armature resistance and being arranged to cause the movement of a light beam cutoff shield, said housing being made of a plastic material, characterized in that said armature resistance is comprised between 25 and 120 Ohms.

Thus, thanks to the increase of the motor armature resistance beyond 25 Ohms, it is proposed to reduce the intensity crossing the conductive wire and thus to reduce the power the motor has to dissipate. Thus, it is not necessary any more to arrange an electronic board with the motor. The self-heating temperature of the motor is then comprised between 15 and 90° C., more preferably between 30 and 50° C. In such a way, the motor temperature stays lower than 220° C. when the light source of the optical module operates. The motor support housing can then be selected in a plastic material being resistant to such temperatures, for example PES (Polyethylene Sulfide), PET (Polyethylene Terephthalate) or PBT (Polybutylene Terephthalate).

The increase of the conductive wire length is obtained in particular thanks to an increase of the motor size. Such size being limited by the maximum space occupied by the cutoff mechanism, the section of the conductive wire is in particular reduced so as to increase the length thereof. The result of this is a decrease of the motor torque. Beyond an armature resistance of 120 Ohms, the motor then presents a torque being insufficient to drive the cutoff shield and/or a size being incompatible with the space available within the optical module for the cutoff mechanism.

In an advantageous embodiment of the invention, said armature resistance is comprised between 40 and 90 Ohms. In a particularly advantageous way, said armature resistance is substantially equal to 55 Ohms. The term "substantially" means a tolerance of more or less fifteen percent around the target value.

According to an advantageous embodiment of the invention, said motor comprises at least three coils. The motor comprises in particular three coils. The presence of at least three coils in the motor enables to provide it with a more constant torque, for example, than a motor having two coils. The presence of at least three coils enables to drive a motor shaft connected to a pinion over more than half a turn, i.e. over more than 180°, contrary to a motor only having two coils. The presence of tree coils enables to drive the motor shaft over more than half a turn even starting from a state in which the motor shaft does not turn yet. Thanks to the presence of three coils, the rotation movement transmitted to the shield by the pinion can be geared down while providing a sufficient rotation of the shield between its first and its second angular positions, i.e. a rotation of the shield being higher than 60°. Due to the gearing down, the torque being necessary to drive the shield is less significant, which enables to further reduce the section of the conductive wire and thus to increase the armature resistance, in particular until 120 Ohms.

According to an embodiment of the invention, said mechanism comprises said cutoff shield.

In an interesting embodiment of the invention, said pinion of the motor drives said cutoff shield through a gear, the rotational angle of the shield being lower than the rotational angle of said pinion. The gear is for example an inner tooth gear. The inner tooth gear enables to increase the space being available for the motor within the cutoff mechanism, in particular with respect to a solution presenting an outer tooth gear. It is then possible to select a bigger motor having a more significant armature resistance without increasing the general space occupied by the optical module.

Advantageously, the gearing ratio between the pinion of the motor and the gear is comprised between 1/5 and 1/2. It is in particular equal to 1/3.

In an embodiment of the invention, said shield mainly extends in a first plan, said shield having a tilted portion with respect to such first plan in a rotation according to an axis parallel with a rotational axis of the shield. The tilted portion enables the shield to be driven with no contact with the motor. Thus, it enables to increase the available space for the motor within the cutoff mechanism. It is then possible to select a bigger motor having a more significant armature resistance without increasing the general space occupied by the optical module.

According to an exemplary embodiment of the invention, said shield is arranged to make a rotation of at least 75° between a vertical position and a tilted position.

In an embodiment of the invention, the motor has a length higher than 26 mm. Advantageously, the motor has a diameter higher than 21 mm. The increase in the volume of the motor, i.e. of its length and/or of its diameter makes it possible in particular to increase its armature resistance.

The invention also relates to an optical module comprising a cutoff mechanism such as above described.

Other characteristics and advantages of the invention will further appear better upon reading the following description of an exemplary embodiment of an optical module according to the invention, referring to the accompanying drawing, wherein.

Figure 1:
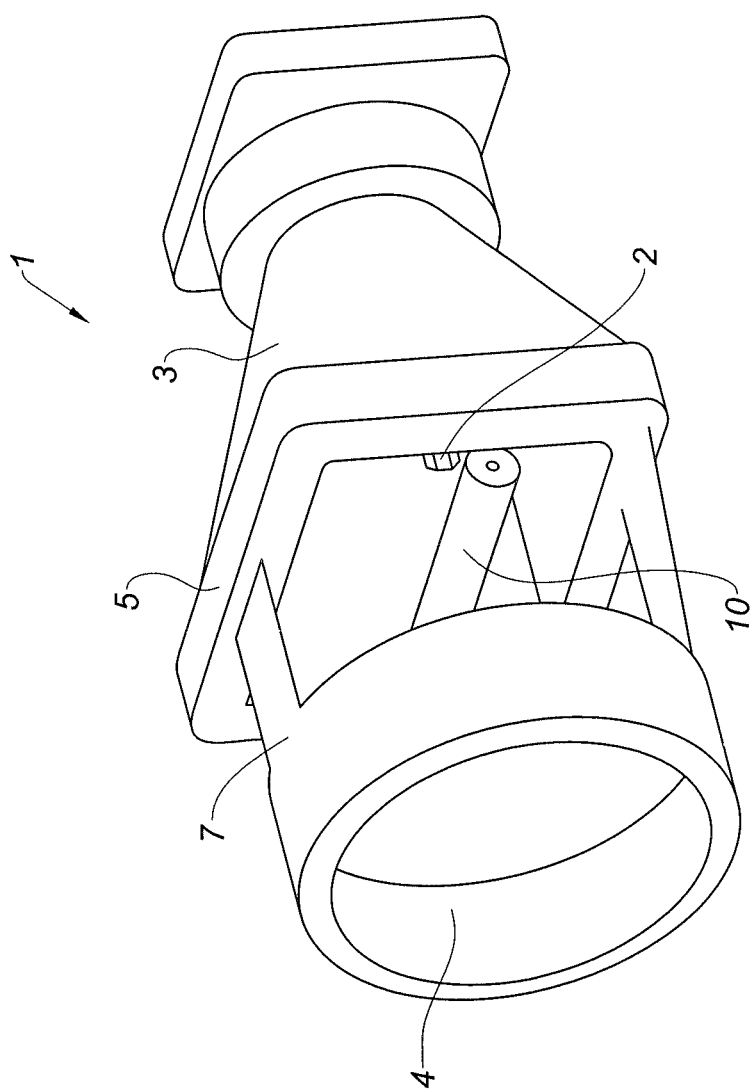
FIG. 1 is a perspective schematic view of an optical module with a cutoff mechanism.

FIG. 1 enables to illustrate an optical module 1 according to the invention. In such optical module, there is a light source 2 generating a light beam reflected by an optical reflector 3. The light beam is then projected on a lens 4 that inverts it and returns it back on the road located in the front of the vehicle, in which the optical module is positioned. The lens 4 is arranged on a lens carrier 7. The light source is here a halogen lamp.

A cutoff mechanism 5 is arranged between the reflector 3 and the lens 4. Such cutoff mechanism 5 enables to block out more or less the light beam in reply to an order of the vehicle's user or to an automatic order, so as to propose different lighting modes for the road. The cutoff mechanism 5 comprises a driving motor, in particular a direct current motor.

Figure 4:
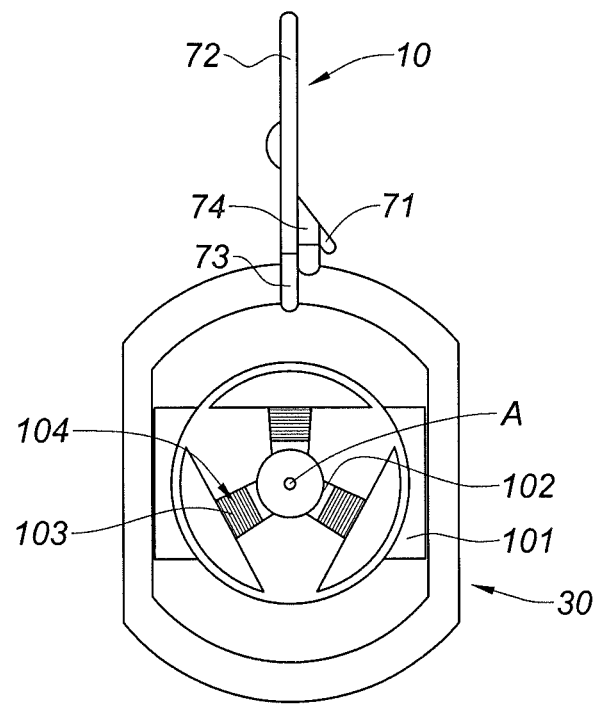
FIG. 4 is a schematic side view of the motor inside and the cutoff shield according to the invention.

As illustrated on FIG. 4, the motor 30 comprises a stator 101 also called inductor and a rotor 102. When the motor 30 operates, the stator 101 generates a magnetic field that drives into rotation the rotor 102 around a longitudinal axis A. The rotation movement is then transmitted to a motor pinion. The motor 30 comprises for instance at least three coils 103. It is question here of the coils 103 of the rotor 102, otherwise called armature windings or armature. Such coils 103 comprise a conductive wire 104, in particular in copper, and presenting a resistance, the so-called armature resistance. The motor 30 is thus provided with an armature resistance.

Figure 2:
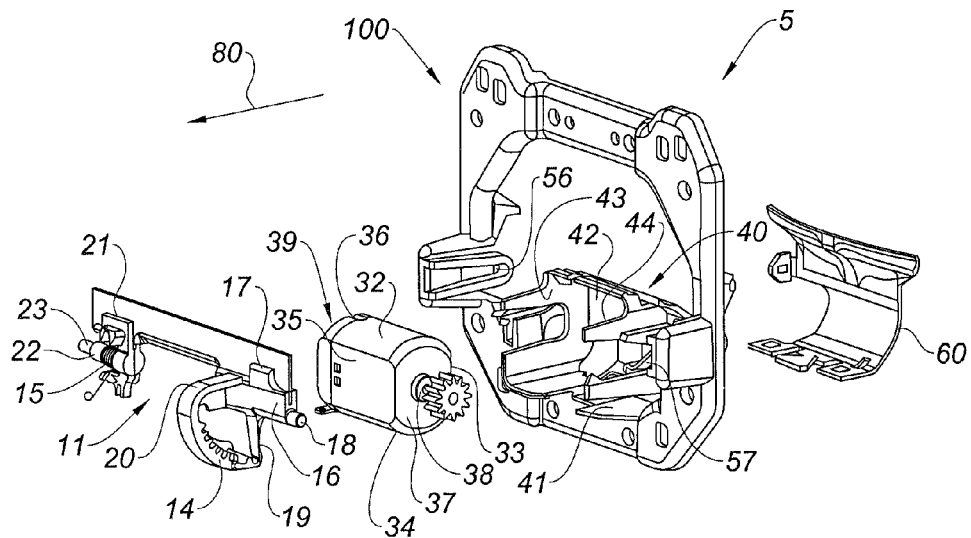
FIG. 2 is a perspective exploded view of the cutting mechanism.
Figure 3:
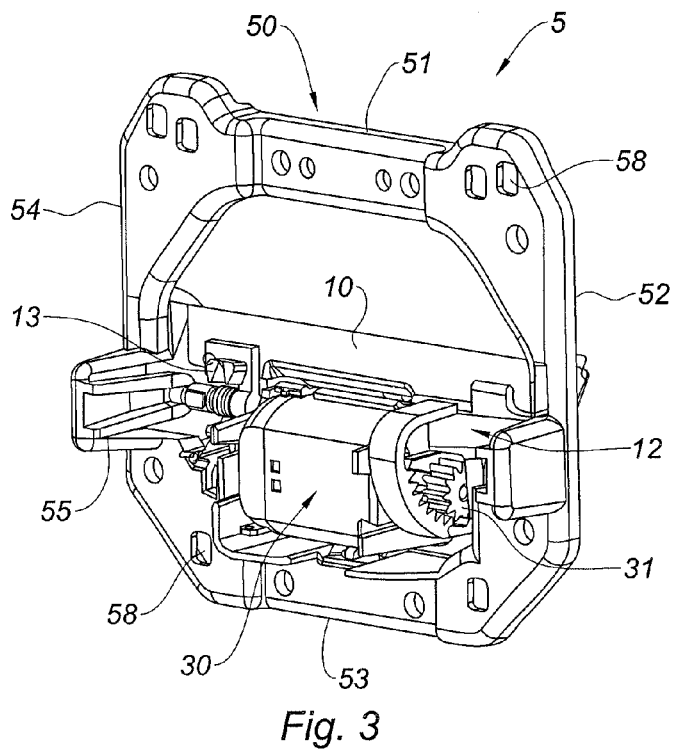
FIG. 3 is perspective view of the cutoff mechanism illustrated on FIG. 2, once assembled.

Such cutoff mechanism 5 will now be described more in details thanks to FIGS. 2 and 3. Further on in the description, the terms front, rear, right, left, upper and lower are defined with respect to the forward direction of the vehicle, i.e. with respect to the arrow direction referenced 80 on FIG. 2.

The motor 30 is arranged so as to cause the movement of a cutoff shield 10 for the light beam. The motor 30 enables the shield 10 to be positioned according to various positions, here according to two positions, so as to block out more or less the light beam. For this, the motor 30 comprises the driving pinion 31. Such pinion 31 is connected to an inner tooth gear 14 that drives the shield 10 in movement and particularly in rotation, as explained further on. According to the invention, the armature resistance is comprised between 25 and 120 Ohms, in particular between 40 and 90 Ohms and, more particularly, substantially equal to 55 Ohms. Such armature resistances are obtained in particular thanks to a conductive wire of a section being substantially equal to 0.09 mm. In the case when the motor comprises three coils, each of them comprises for example substantially 700 winding turns of the conductive wire.

The motor operation voltage is for instance comprised between 9 and 16 V. The power to be dissipated by the motor is particularly comprised between 1 and 4 Watts. The self-heating temperature of the motor is then limited to 90° C. and, in particular, to 50° C.

The motor 30 comprises an upper side 32, a rear side 33, a lower side 34, a front side 35, a right side 36 and a left side 37. The upper side 32 and the lower side 34, being opposite to each other, have curved shapes. They define a cylinder part, the axis of which is located in the centre of the motor 30, i.e. here in the centre of the pinion 31. The motor 30 then takes the shape of a cylinder being cut at the level of the front 35 and rear 33 sides.

On the right part of the motor 30 a connection area 39 is located, being arranged so as to connect the motor 30 with a power source, for example, a current source (not shown). Thus, the connection area 39 defines the right side 36 of the motor 30 and a part of the upper 32, rear 33, lower 34 and front 35 sides located on the right part of the motor 30.

The motor 30 presents a length of less than 35 mm, in particular substantially equal to 30.5 mm. It presents a diameter of less than 30 mm, for example substantially equal to 24.2 mm. Beyond one and/or the other of such dimensions, the motor presents the disadvantage to be heavy and/or expensive. With the objective of reaching an armature resistance higher than 25 Ohms, the motor has a length higher than 26 mm and/or a diameter higher than 21 mm. The length of the motor is measured along the axis of the motor passing by the pinion 31 but does not contain the length of the pinion. The length of the motor is then the distance between its left side 37 and its right side 36.

The pinion 31 is located at the level of the left side 37 of the motor 30. It is mounted on a driving shaft 38 projecting with respect to the left side 37 of the motor 30 and located substantially in the middle of the left side 37 of the motor 30.

The cutoff mechanism 5 comprises a housing 100, in particular in a plastic material. Such housing 100 comprises a frame 50 of a substantially rectangular shape so that it presents four interconnected branches, so-called an upper branch 51, a left branch 52, a lower branch 53 and a right branch 54. The housing 100 also comprises a motor carrier 40.

The motor 30 is mounted on the housing 100, in particular at the level of the motor carrier 40. Such motor carrier 40 is located in the centre and towards the rear side of the frame 50, i.e. between the motor and the light source, once the cutoff mechanism 5 is mounted in the optical module.

The motor carrier 40 comprises a lower wall 41 located opposite the lower side 34 of the motor 30, a rear wall or bottom 42 located opposite the rear side 33 of the motor 30, a rear part of the upper side 32 and a rear part of the lower side 34 so that the motor 30 is in contact with the rear wall 42. The motor carrier 40 also comprises a right wall 43 with a U-shape, a central branch of the U being arranged backwards vertically and the two side branches of the U being substantially parallel between them, horizontal and oriented forwardly. The right wall 43 of the motor carrier 40 thus defines a notch inside which a boss (non visible) of the connection area 39, through which the motor is connected with the current source, is inserted and makes integrally part of the motor carrier 40. In the same way, the motor carrier 40 comprises a left wall 44 in a U-shape, a central branch of the U being arranged rearwards vertically and the two side branches of the U being substantially parallel between them, horizontal and oriented forwardly. The right wall 43 of the motor carrier 40 thus defines a notch inside which the shaft 38 comprising the pinion 31 can be inserted, the pinion 31 projecting then beyond the carrier 40 of the motor 30 towards the left.

The cutoff mechanism 5 also comprises a thermal screen 60 meeting an external side of the rear wall 42 of the carrier 40 of the motor 30, i.e. a side oriented rearwards. The heat screen 60 is thus located between the motor carrier 40 and the light source. It is made of a metal so that it protects the motor carrier 40 and the motor 30 from heat dissipated by the light source.

The cutoff shield 10 is part of the cutoff mechanism 5. It is arranged so as to block out more or less the light beam, i.e. to cut more or less the light beam. The shield mainly extends along a first plan. The shield 10 can be positioned here according two positions, a first position in which it blocks out partially the light beam and corresponding to the low beam, and a second position in which it does not block out the light beam and corresponding to the high beam. In the first position thereof, the cutoff shield 10 extends according to a substantially vertical plan, whereas, in the second position thereof, it extends in a substantially horizontal plan, for example being substantially tilted of 75° with respect to the vertical. It is here a bi-functional cutoff mechanism 5.

The cutoff shield 10 is positioned opposite the light source. It is mounted on a shield carrier 11 comprising a first part 12 provided with the inner tooth gear 14, located at the level of a first longitudinal end of the shield 10, and a second part 13 provided with a return spring 15 tending to bring the shield back in its first position, i.e. in its substantially vertical position, the second part 13 being located at the level of a second longitudinal end of the shield 10. The cutoff shield 10 is made of steel so as to resist the strong heats emitted by the light source, whereas the first part 12 and the second part 13 of the shield carrier 11 are in plastics, because they are off-centre with respect to the light source and thus less exposed than the shield 10 to the heat emitted by the light source. The spring 15 of the second part 13 is however in metal. The first longitudinal end is located on the left part of the shield 10, whereas the second longitudinal end is located on the right part of the shield 10.

The second part 13 comprises a clip 21 pinching the shield through the bottom and on either side of the latter, i.e. it pinches it on a front side and on a rear side of the shield 10 so as to support it. The clip 21 of the second part 13 originates at the level of an arm 22, that the second part 13 comprises, extending parallel to a longitudinal extension axis of the shield 10. At the level of a distal end of the arm 22 located on the right part there is an excrescence 23 extending beyond the shield 10 towards the right. The spring 15 is here wound around the arm 22 of the second part 13 and exerts a return force on the clip 21 of the second part 13.

The first part 12 of the shield carrier 11 comprises a central body 16 of a substantially parallelepiped shape from which a clip 17 originates to pinch the shield 10 from the bottom so as to support it. The clip 17 of the first part 12 is similar to the clip of the second part 13, i.e. it pinches the shield 10 on the front side and on the rear side of the latter. The first part 12 of the carrier 11 also comprises an excrescence 18 projecting with respect to the central body 16, towards the left part and extending beyond the shield 10 towards the left part.

From the central body 16 two arms also originate, so-called first and second arms 19, 20. The first arm 19 extends in a common plan with the shield 10, perpendicular to the longitudinal extension direction of the shield 10. The second arm extends according to a direction perpendicular to the plan in which the shield 10 extends, i.e. perpendicular to the first arm 19. The inner tooth gear 14 connects the first arm 19 with the second arm 20 and has a substantially circular shape so that it forms a quadrant between the first and the second arms 19, 20.

The gearing ratio between the pinion 31 of the motor 30 and the gear 14 is here equal to 1/3. The presence of at least three coils enables to drive the pinion on more than 180° around its axis of rotation, so as to drive the cutoff shield on more than 60° around its axis of rotation when the gear ratio is 1/3. With a rotation of 360°, the pinion will be able to drive the cutoff shield in a rotation of 120°. The gear ratio could of course be different, according to the motor torque and/or the desired rotation of the shield. It will be comprised in particular between 1/5 and 1/2.

The fact that the gear 14 is provided with inner teeth enables the motor 30 to move back with respect to the frame 50 and thus to reduce the space occupied by the mechanism cutoff 5 while keeping a gearing ratio of 1/3 necessary for the rotation driving of the shield 10.

The shield carrier 11 is mounted on the frame 50. On the right branch 54 of the frame 50 a groove is arranged, having a flared shape towards the front part and presenting an opening 56 at the level of a rear end, arranged to receive the excrescence 23 of the second part 13 of the carrier. The excrescence 23 of the second part of the shield carrier 11 is thus inserted into the groove 55 from the front to the rear up to the moment where it enters the opening 56. On a same way, on the left branch 52 of the frame 50 there is a groove 57 of a similar shape as the groove of the right branch 54, i.e. with a flared shape towards the front and having an opening (non visible) at the level of a rear end arranged to receive the excrescence 18 of the first part 12 of the carrier.

Moreover, the frame 50 comprises borings being distributed on the branches 51, 52, 53, 54 thereof and arranged to mount the cutoff mechanism 5 in the optical module.

It should be noticed here that the shield 10 comprises a rotation axis defined by the excrescences 18, 23. Such rotation axis is offset with respect to the rotation axis of the motor 30, i.e. the rotation axis of the pinion 31. The rotation axis of the shield 30 is located in particular above the motor rotation axis along a vertical axis.

Figure 5:
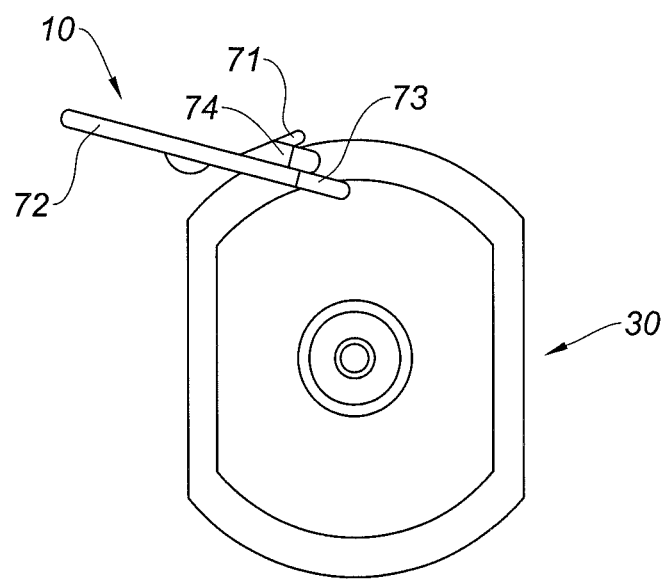
FIG. 5 is a side view of the motor and the cutoff shield according to the invention.

FIGS. 4 and 5 allow a particularly advantageous embodiment of the invention to be illustrated, according to which the shield presents a tilted portion 71. FIG. 4 illustrates the shield 10 in its first position, i.e. in its vertical position. The vertical position corresponds to the position in which the cutoff shield blocks out the light beam so as to limit the range of the projector to the low beam. FIG. 5 represents the shield 10 in its second position, i.e. in its tilted position of substantially 75° with respect to the vertical. The tilted position corresponds to the position in which it does not block out or almost not the light beam, the range of the projector then corresponding to the high beam.

The tilted portion 71 is located on a central area of the shield 10. The central area is here located above the motor 30. The tilted portion 71 occupies a lower band of the shield 10, i.e. a band being close to the motor 30. It is tilted towards the back of the cutoff mechanism. It is tilted according to an axis of rotation parallel with the axis of rotation of the shield. The shield 10 also comprises a plane wall 72 extending in the first plan. The plane wall 72 is here located above the tilted wall 71. Parts of the plane wall 72, so-called first and second tabs 73 extend on either part of the tilted wall 71, i.e. on each longitudinal end side of the tilted wall 71. Fins 74 connect the longitudinal ends of the tilted wall 71 with the tabs 73. The tabs 73 are located on either part of the motor 30, i.e. beyond the left and right sides of the motor 30. When the shield 10 modifies its position, the tabs 73 thus do not come into contact with the motor 30.

The tilted portion 71 of the shield 10 allows, when the shield is in its vertical position, the light beam to be sufficiently blocked out so as to enable the projector to light the road with low beam. It enables the shield to carry out a rotation movement of substantially 75° around its rotation axis without coming into contact with the motor. Such rotation allows the shield 10 to reach its second position and to let the light beam free so as to allow the projector to light the road with high beam. This slope thus makes it possible to release some space for the motor, whatever the position of the shield.

It is mainly thanks to the inner tooth gearing and/or to the shape of the shield, i.e. thanks to the tilted portion, that it is possible to arrange a motor of greater size within the housing without modifying the space occupied by the optical module.

The invention claimed is:

1. A cutoff mechanism for an optical module comprising:
a housing; and
a driving motor provided with an armature resistance and being arranged to cause movement of a light beam cutoff shield, said housing being made of a plastic material,
wherein said armature resistance is comprised between 25 and 120 Ohms,
wherein the motor has length greater than 26 mm, and wherein said motor consists of three coils that provide the armature resistance.

2. The cutoff mechanism according to claim 1, wherein said armature resistance is comprised between 40 and 90 Ohms.

3. The cutoff mechanism according to claim 1, wherein said armature resistance is equal to 55 Ohms±15%.

4. The cutoff mechanism according to claim 1, wherein said mechanism comprises said cutoff shield.

5. The cutoff mechanism according to claim 4, wherein a pinion of the motor drives said cutoff shield through a gear, the rotational angle of the shield being lower than the rotational angle of said pinion.

6. The cutoff mechanism according to claim 5, wherein the gearing ratio between the pinion of the motor and the gear is comprised between 1/5 and 1/2.

7. The cutoff mechanism according to claim 4, wherein said shield mainly extends in a first plan, said shield having a tilted portion with respect to such first plan in a rotation according to an axis parallel with a rotational axis of the shield.

8. The cutoff mechanism according to claim 4, wherein said shield is arranged to make a rotation of at least 75 between a vertical position and a tilted position.

9. The cutoff mechanism according to claim 1, wherein the motor has a diameter greater than 21 mm.

10. An optical module comprising a cutoff mechanism as claimed in claim 1.

* * * * *